United States Patent Office.

GEORGE O. BOYNTON, OF BOSTON, ASSIGNOR TO HIMSELF, PRESTON R. MANSFIELD, OF DEDHAM, AND GEORGE STEPHEN, OF SOMERVILLE, MASSACHUSETTS.

VENEERING WOOD, &c.

SPECIFICATION forming part of Letters Patent No. 304,409, dated September 2, 1884.

Application filed January 30, 1884. (No specimens.)

*To all whom it may concern:*

Be it known that I, GEORGE O. BOYNTON, of Boston, in the county of Suffolk and State of Massachusetts, have invented certain new and useful Improvements in Veneeering Wood, &c., of which the following is a full, clear, and exact description.

This invention relates to the covering of wood or other suitable material with a thin sheet, or plate, or veneer of material composed of paper, paper-pulp, or vegetable, animal, fibrous, or other suitable material which has first been treated to the action of sulphuric acid, or chloride of zinc, or other equivalent acid, either of full strength or diluted, as desired, and each, either alone or in combination with the other, or with any other suitable substance or substances—such as dextrine, &c.—and then subjecting said sheet or veneer to water, preferably at a low temperature, and either alone or in combination with an alkaline or saline substance, and then drying the same; and the invention consists in taking such prepared sheet, plate, or veneer and applying and securing the same to a backing of wood or any suitable and desirable material by paste, glue, or cement, or any suitable adhesive material, all substantially as hereinafter described.

In carrying out this invention, paper-pulp or vegetable, animal, fibrous, or any suitable material is preferably first made into the form of a thin sheet, or plate, or veneer of any suitable and desirable thickness and in any suitable manner, and then said sheet, plate, or veneer is treated in any suitable and desirable manner to the action of sulphuric acid, or chloride of zinc, or other equivalent acid, either of full strength or diluted, as desired, and each either alone or in combination with the other or with any suitable substance or substances—such as dextrine, &c.— and then said material is subjected to or passed through a bath of water, preferably at a low temperature, and either alone or in combination with an alkaline or saline substance, and then dried. When dry, its surface and the surface of the backing of wood, &c., to which it is to be applied having been properly prepared for the purpose, it is then, with paste, glue, cement, or any suitable adhesive material, applied and secured to the backing of wood or other suitable and desirable material in the usual and well-known manner of applying and securing a veneer to wood, &c. When set and dry, the outer surface of the sheet, plate, or veneer is smoothed and polished as desired.

The material of which the sheet, plate, or veneer is made as aforesaid, previous to its treatment with acid and water, can be colored in any suitable manner; or the outer surface of the sheet, plate, or veneer, after being secured to its backing, can be then stained or colored as desired. The surface, also, can be smoothed and polished to a very high degree, as the treatment by the acid and water of the material as aforesaid causes the fibers or particles of the material to come closely and compactly together, presenting a fine and smooth surface particularly adapted to receive a clear and high polish. The material, when being treated with the acid and water, can be in its sheet, plate, or veneer form, or it can be in the form of pulp and made into sheets during the treatment with acid and water, or in any desirable manner, the invention not being limited to any particular manner of treating the said material to the acid and water, nor to any particular manner of forming or making the said sheet, plate, or veneer. The manner of treating such material with acid and water is well known, and one that is described and claimed in several Letters-Patent of the United States by which the so-called "parchment paper" is produced, and therefore it is not intended in this application to claim the treatment of said material, *per se.*

Having thus described my invention, what I claim is—

Applying and securing to wood or any suitable material, with paste, glue, or cement, or any suitable adhesive substance, a sheet, plate, or veneer of paper or other suitable material which has been treated with an acid and then water, substantially as and for the purpose specified.

In testimony whereof I have hereunto set my hand in the presence of two subscribing witnesses.

GEORGE O. BOYNTON.

Witnesses:
EDWIN W. BROWN,
WM. S. BELLOWS.